June 28, 1932.  F. WAGNER ET AL  1,864,967
MEASURING APPARATUS
Filed June 6, 1928   2 Sheets-Sheet 1
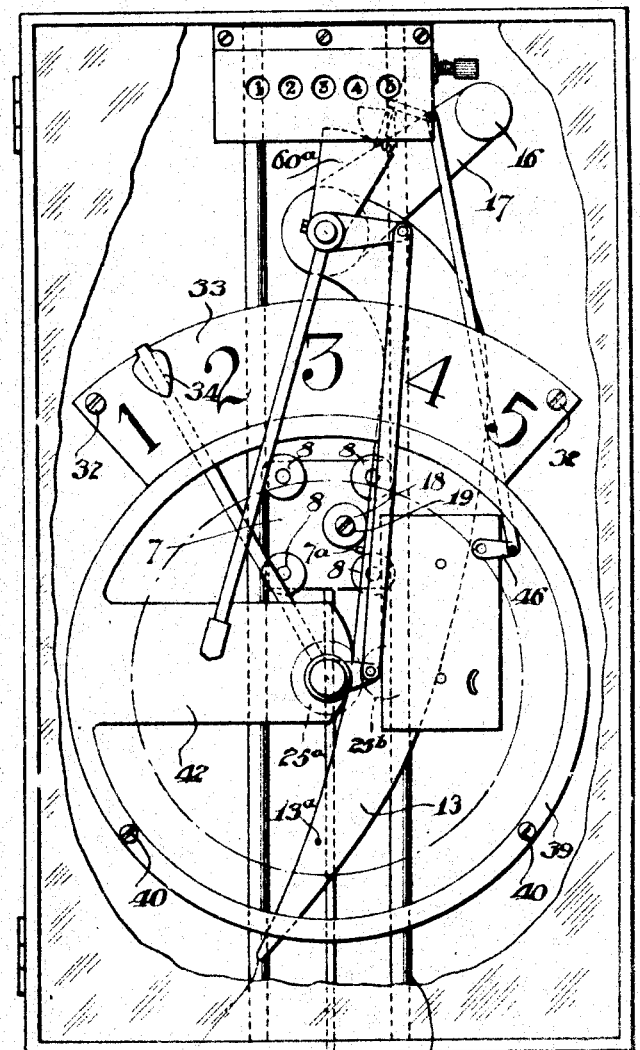
FIG. 1.
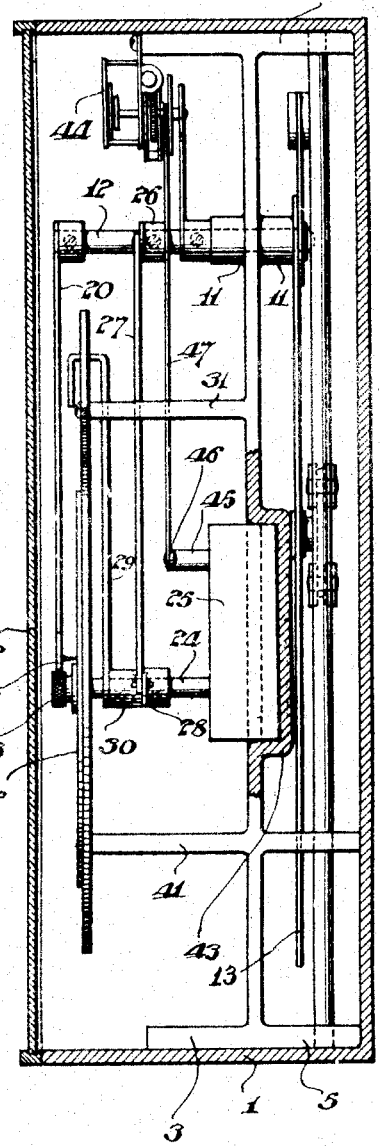
FIG. 2.
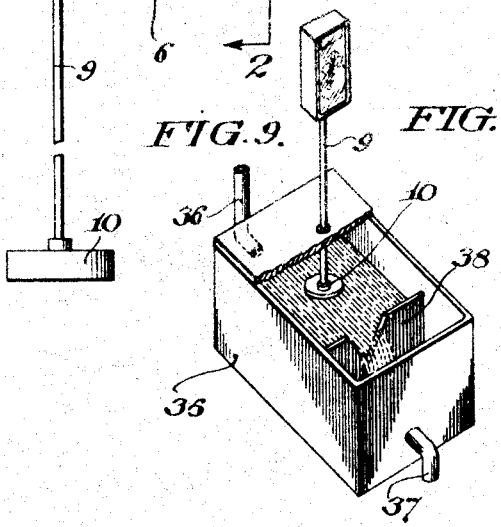
FIG. 9.   FIG. 8.
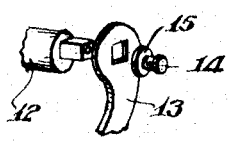
INVENTORS:
Frederick Wagner and
Howard C. Mitchell
BY Cornelius L. Ehret
their ATTORNEY June 28, 1932.  F. WAGNER ET AL  1,864,967
MEASURING APPARATUS
Filed June 6, 1928   2 Sheets-Sheet 2

INVENTORS.
Fredrick Wagner and
BY Howard C. Mitchell
Cornelius L. Ehret
their ATTORNEY.

Patented June 28, 1932

1,864,967

UNITED STATES PATENT OFFICE

FREDRICK WAGNER, OF ATCO, NEW JERSEY, AND HOWARD C. MITCHELL, OF PHILADELPHIA, PENNSYLVANIA, ASSIGNORS TO COCHRANE CORPORATION, OF PHILADELPHIA, PENNSYLVANIA, A CORPORATION OF PENNSYLVANIA

MEASURING APPARATUS

Application filed June 6, 1928. Serial No. 283,243.

Our invention relates to measuring apparatus of a character by which there is effected integration of magnitudes of quantities or conditions, or, for example, of flow of a fluid.

In accordance with our invention, the integrating or counting mechanism is controlled through co-acting clutch members, the duration of whose co-action is controlled in accordance with changes in magnitudes of the quantities or conditions to be measured or integrated; and more particularly, there intervenes between an element, whose movements or positions represent the quantities or conditions in question, and the means for varying the duration of co-action of clutch members, a compensating or rectifying cam.

Further in accordance with our invention, there is provided an horologic device continuously to oscillate a clutch member, as a pawl, through an angle of fixed or predetermined magnitude, the duration of engagement between the clutch members, as the pawl and a ratchet wheel, the latter actuating or controlling an element of the integrating apparatus, being determined by the position of the compensating cam; more particularly and preferably, the horologic device drives the clutch member through a substantially rigid connection.

Our invention further resides in features of construction, arrangement and combination hereinafter described and claimed.

For an illustration of one of the forms our invention may take, reference is to be had to the accompanying drawings in which:

Fig. 1 is a front elevational view of an apparatus embodying our invention.

Fig. 2 is a side elevational view partly in section, the section taken on line 2—2 in Fig. 1.

Fig. 8 is a detail perspective view illustating a feature of construction.

Figure 3:
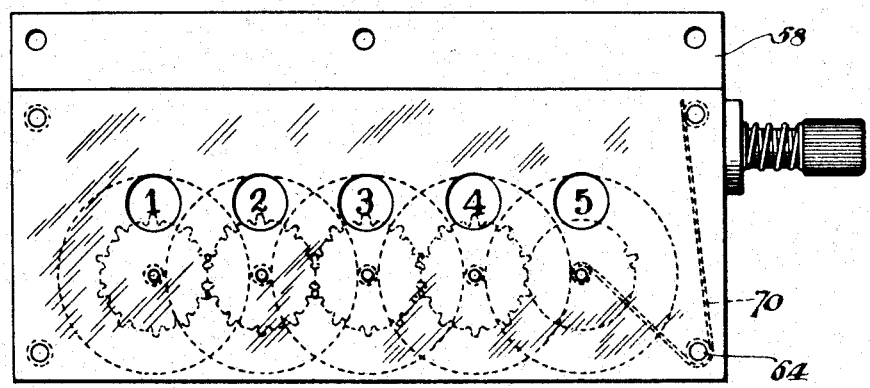
Fig. 3 is a front elevational view, on an enlarged scale, of integrating mechanism shown in Fig. 1.
Figure 4:
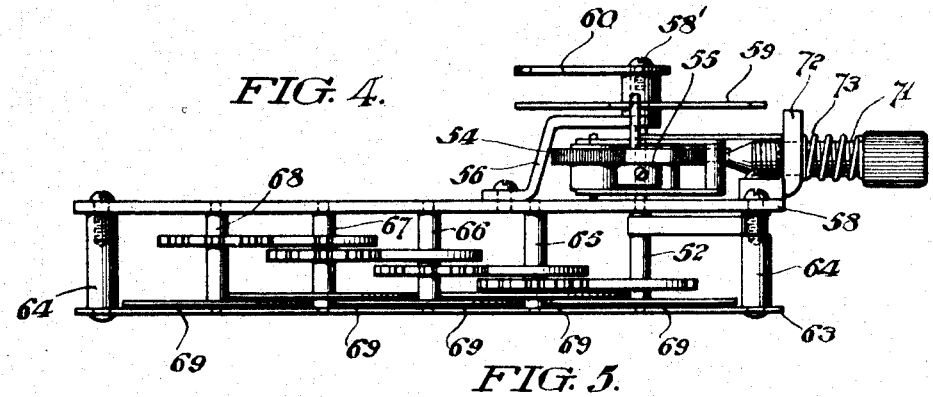
Fig. 4 is a top plan view of the mechanism of Fig. 3.
Figure 5:
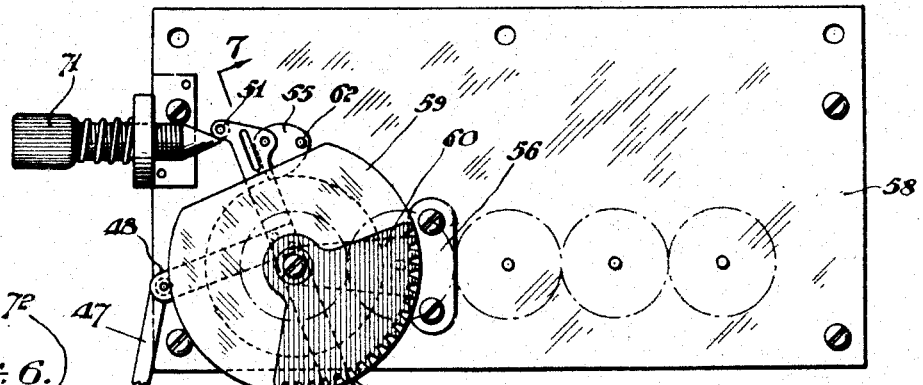
Fig. 5 is a rear elevational view of the structure of Fig. 3.
Figure 6:
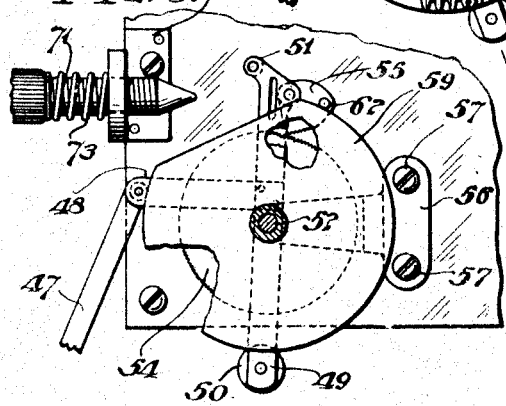
Figs. 6 and 7 are fragmentary detail views of clutch mechanism shown in Figs. 4 and 5.
Figure 7:
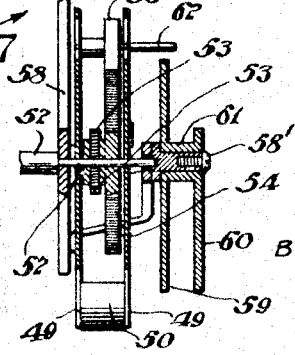

Fig. 9 diagrammatically illustrates one of the uses of our invention.

Referring to Figs. 1 and 2, within a housing 1, having a wall 2, the whole or at least a part of which is of transparent material as glass and displaceable when necessary or desirable for purposes hereinafter described, is disposed a casting 3 having top and base members 4 and 5, respectively, which receive the upper and lower extremities of spaced rods or bars 6 between which reciprocates a carriage member 7 having grooved rollers 8 which engage the rods in the manner illustrated. Adjustably secured to the carriage member 7 and depending therefrom is a rod 9 to the lower end of which is suitably attached a float member 10.

Near its upper end, the casting 3 is provided with a bearing 11 extending on opposite sides thereof and which receives a shaft 12 having an end adjacent and substantially equidistant from the rods 6, to which is secured a compensating cam 13.

Preferably the cam 13 is punched from a metal sheet, the aperture 13a and the hole for shaft 12 being utilized to determine the position of unpunched plate with respect to the punching dies, and therefore the zero point of the cam face contour with respect to aperture 13a.

Referring to Fig. 8, the end of the shaft 12 terminates in a portion which is non-circular or square as shown, which portion passes through an aperture of similar shape in the upper end of cam 13, the cam being retained on the shaft by a screw 14 threadably engaging the squared end of the shaft and clamping the cam between the shaft and the head of the screw 14 or a washer 15. The cam is constantly biased to rotate in a clockwise direction as viewed in Fig. 1 by any suitable mechanism, for example and preferably, by a weight 16 affixed to the end of an arm 17 attached to the shaft 12, as by being clamped between the screw 14 and the cam 13, which movement of cam 13 however is limited by a stop or abutment 18, preferably a roller freely rotatable on a screw 19, carried by the carriage member 7 and reciprocable therewith to determine the position of cam 13 and mechanism associated therewith and hereinafter described.

To the opposite end of the shaft 12 is secured the arm 20 the lower end of which is provided with a suitable marking means as a stylus, or pen 21 which indicates the instantaneous position of cam 13 and which is also adapted to trace on a recorder sheet 22, clamped by thumb nut 23 to a shaft 24 driven by a clock 25 through gears 25a and 25b attached respectively to shaft 24 and a clock-driven shaft, not shown, a continuous record of the positions that the cam 13 assumes during rotation of the disk 22.

The crank arm 26 secured to shaft 12 intermediate its ends transmits movement of the cam 13 through a connecting link 27 and crank arm 28 to an indicating member or pointer 29 secured to a sleeve 30 freely rotatable on shaft 24 and integral with or suitably secured to crank arm 28.

To the outer ends of posts or standards 31 projecting forwardly from and preferably integral with casting 3, is secured, as by screws 32, an indicating plate 33. Near its free end the pointer 29 is bent forwardly and downwardly to provide a tip portion 34 disposed in front of and cooperating with the scale member 33 continuously to indicate the instantaneous variable position of cam 13.

The mechanism thus far described may be used, for example, to indicate or record, or simultaneously indicate and record, the flow of a liquid, as water, through a tank 35 (Fig. 9) having intermediate the input pipe 36 and the output pipe 37, notched weir plate 38. As is well understood in the art, the liquid level at the inlet end of the tank is a function of the rate of flow of the liquid over the notched weir plate. To indicate or record variation in the liquid level on a substantially linear scale, there is interposed between the float 10 and the indicator 34, the cam 13, the contour of whose face in engagement with the stop or abutment 18 is designed and cut to give equal increments of movement of the pen arm 20 for equal increments of change in the rate of flow of liquid through the tank 35. Upon increase in height of the liquid in the tank 35 the float 10 raises the carriage 7 and with it the abutment 18, the cam 13 rotating clockwise under the influence of the weight 16 constantly to bear against the abutment during movement of the carriage, the angular displacement of the cam and of the recording arm 20 varying in extent for equal increments of movement of the carriage 7 in accordance to the curvature or contour of the cam. The change in position of the float and hence of the rate of flow of liquid is recorded upon the circular recorder sheet 22, revolving, for example, one revolution per day, by the stylus 21 or equivalent of the recorder arm 20, the tip 34 of the indicating arm 29 indicating for any given instant the present rate of flow.

It is characteristic of the construction described that shocks imparted to the actuating rod as by violent and sudden changes of fluid flow are not transmitted to the relatively sensitive mechanism of the apparatus. As there is no fixed or rigid connection between the carriage abutment 18 and cam 13, rapid upward movement of the carriage tends to move the abutment out of contact with cam 13, lessening the contact pressure between them which cannot exceed that due to the biasing weight 16 in clockwise rotation of cam 13. Downward movement of the carriage 7 is effected substantially solely under the influence of a constant biasing force, in the described construction, that of gravity, which being relatively small, and active only through a comparatively short distance, is incapable of delivering an appreciable shock to the cam. Furthermore the suspended cam 13 and its counterweight or an equivalent construction constitute a buffer arrangement which tends to reduce shock during counterclockwise rotation of the cam.

In other words, it will be seen from the foregoing that the element or abutment 18 and the cam 13 are disposed in such relation with respect to each other that upward movement of the abutment is in a direction away from the cam surface to permit free clockwise movement of the cam solely by the biasing force of gravity provided by the weight 16, and downward movement of the abutment causes the same to engage the cam surface and induce counter clockwise movement of the cam solely by the force of gravity acting on the abutment and the associated carriage 7, rod 9 and float 10.

In the present improved construction, therefore, the action is such that movement of the measuring element or means, such as the pen arm 20, the indicating arm 29, the gear segment 60a for the integrating or counting mechanism, or other equivalent element or elements, is imparted thereto in both directions solely by the force of gravity by co-action of cam 13 and abutment 18. In other words the means, including the co-operating cam 13 and abutment 18, effect or control measuring action in either sense solely by the action of gravity.

Integral with or suitably secured to the indicator plate 33 is a ring 39 through which pass the screws 40 into the ends of standards 41 projecting forwardly from and preferably integral with the casting 3. A member 42 inwardly extending from and preferably integral with the ring 39 supports the back of the recorder disk 22 in the path of movement of the recording pen to prevent deformation of a sheet by the pen and to insure that legible record results.

Upon displacement of the wall 2 of housing 1, and after removal of actuating rod 9, the entire assembly may be removed as a unit for inspection, repair or replacement of parts. For example, the device may be utilized with an apparatus other than a V notch weir in which event, compensating cam 13 as described is removed and replaced by one having a proper contour compensating for a different law of operation of the apparatus.

In installing the device, for example, in a system as above described, a suitable tool or pin is inserted through the aperture 13a in the cam 13 and relative movement of cam 13 and carriage 7 effected until the pin engages a recess or hole 7a in carriage 7, in which position the roller 18 engages the cam face at its zero point. The pointer 29 and recorder arm 20 should then be disposed opposite the zero mark of their respective scales and the actuating rod 9 adjusted to its proper position.

The clockwork mechanism 25 disposed and secured within a recessed portion 43 of the casting is also utilized to actuate an integrating mechanism 44 which directly indicates the total flow of liquid, as water. To the end of shaft 45 of the clockwork 25 is secured a crank arm 46 connected through link 47 to the arm 48 of a framework comprising two spaced members 49 connected at their lower ends by a spacer 50, preferably weighted, and at their upper ends by a cross-bar 51, and pivoted intermediate their ends and freely rotatable on a shaft 52, to which is secured as by set screws 53 a disk 54 having a serrated edge or periphery adapted to be engaged by the correspondingly serrated portion of a weighted pawl member 55 pivoted between frame members 49 at or near their upper ends. The outer end of shaft 52 is journaled in the free end of a bracket member 56 secured as by screws 57 to the base plate 58 of integrating mechanism 44. Suitably attached to the bracket 56 and concentric with shaft 52 is a bearing 58' on which is rotatably mounted a unit comprising the cam 59, gear segment 60 and a sleeve 61 connecting them. The gear segment 60 is in meshing engagement with a gear segment 60a secured to and rotatable about shaft 12 as an axis, the position of the high part of the cam 59 therefore being determined by the position of the compensating cam 13, and indirectly to the position of float 10. By using a single horologic mechanism 25, there is obtained exact synchronism between rotation of the recorder disk and of the oscillations of the cam-supporting framework. The edge of the cam 59 is in the path of and adapted to engage a pin 62 extending from the pawl member 55 to effect disengagement of the pawl from the ratchet disk 54. Upon relative movement of the pawl and cam to a position in which the pin 62 is not in engagement with the periphery of the cam, the pawl by its weight drops into engagement with the ratchet disk or wheel 54. Secured to the shaft 52 between the base or main plate 58 and a front plate 63 spaced therefrom as by columns or standards 64 is the first gear of a Geneva train comprising the shafts 65, 66, 67 and 68, having their opposite ends journaled in the plates 58 and 63 and on which are mounted Geneva gears and indicating dials in the usual manner. As is customary the front plate 63 is provided with a series of apertures through which the numerals on the respective indicating dials 69 appear in succession.

A flat spring 70 of suitable metal as phosphor bronze is bent over one of the standards 64 and the free ends of the spring engage respectively another of the standards, as shown, and the shaft 52. The two standards or posts 64 with which the spring 70 is in contact may be suitably recessed to prevent lateral displacement of the spring. The spring may be withdrawn when desired by moving the free ends towards each other and moving the spring downwardly and to the right, as viewed in Fig. 3.

The shaft 45 is rotated at a constant speed by the clockwork mechanism 25 and the pawl 55, through crank arm 46, connecting rod 47, and frame members 49, is oscillated through an angle of fixed or predetermined magnitude at a constant frequency, as for example, one reciprocation per minute. The load imposed upon the clockwork driving mechanism is, therefore, practically constant.

The angle may be nicely adjusted by rotation of screw 71 supported by a bracket 72 secured to plate 58, and having a tapered end adapted to engage cross bar 51 of the oscillating framework carrying pawl 55 at one end of its range of movement. A stiff helical spring coiled about the screw between bracket 72 and the knurled head of the screw holds it firmly in adjusted position. After engagement of the bar 51 and the end of screw 71, upon continued rotation of crank arm 46, the connecting link 47 which is slightly bowed, straightens to an extent permitting crank arm 46 to continue to revolve.

In the installing of the apparatus or thereafter when it is desired to check the accuracy of the integrating mechanism, the carriage 7 is moved to its lowest position and the arm 48 oscillated several times. No change of reading of the indicating dials should result. The carriage is then moved to a second position, as to its most upward one, and the arm 48 oscillated a predetermined number of times, if the engagement between the clutch members is of proper duration, a known change of reading is effected. If the change is other than the correct one, screw 71 is adjusted in one direction or the other until the proper change in indication, for a definite number of oscillations of arm 48, and a certain position of cam 13, is produced.

The duration of contact between the pawl 55 and the ratchet disk 54 connected to the indicating mechanism is determined by the position of the high part of cam 59 which as above stated bears a definite relation to the position of the compensating cam 13 and therefore to the instantaneous rate of flow over the notched weir plate 38.

The broad aspects of our invention relating to measuring apparatus in general, and subject matter relating to recording mechanism and indicating mechanism only are not herein claimed, but are claimed in our divisional application Serial No. 369,480, filed June 8, 1929.

It will be understood that our invention is not limited to measurement of flow of liquid over a V notch weir but may be utilized in any system of measurement in which the increments of movement of a member actuated by or movable in response to change in magnitude of a condition are not equal for equal increments of change in magnitude of the condition.

It will be understood, further, that the operating means or mechanism, including cam 13 and the cooperating abutment 18, may be utilized to effect or control, directly or indirectly, operation of one or more elements which individually or in cooperation with each other provide for indication, recording, or integration, or two or more of them simultaneously, of the condition being measured.

What we claim is:

1. Integrating apparatus comprising counting mechanism, a clutch member associated therewith, a second clutch member adapted to cooperate with said first clutch member, horologic mechanism for moving said second clutch member to and fro at constant speed in a path of predetermined, fixed length, and means controlled by a condition under measurement determining the duration of engagement between said clutch members during movement of said second clutch member in said path of fixed length in accordance with the magnitude of said condition.

2. Integrating apparatus comprising counting mechanism having a shaft, a rotatable clutch member mounted thereon, a second clutch member adapted to engage said first clutch member in one direction of movement, means constantly to bias said second member toward said first member, means to oscillate said second clutch member through an angle of predetermined fixed magnitude, and means to determine the duration of periods of engagement between said clutch members in accordance with the varying magnitudes of a condition.

3. Integrating apparatus comprising counting mechanism having a shaft, a ratchet wheel mounted thereon, a pawl adapted to engage said ratchet wheel, structure supporting said pawl, means to oscillate said structure through an angle of fixed magnitude and comprising therewith a moving system, and a cam movable into the path of said pawl to greater or less extent in accordance with the varying magnitudes of a condition to control the duration of the period of engagement between said pawl and ratchet for each oscillation of said pawl.

4. Integrating apparatus comprising counting mechanism having a shaft, a ratchet wheel mounted thereon, a pawl adapted to engage said ratchet wheel, structure supporting said pawl, means including a flexible member to oscillate said structure through an angle of predetermined constant magnitude and comprising therewith a moving system, means to adjust the magnitude of said angle comprising an adjustable stop adapted to engage an element of said system, and a cam controlling the duration of the period of engagement between said pawl and ratchet for each oscillation of said pawl in accordance with the varying magnitudes of a condition.

5. Flow-integrating apparatus comprising counting mechanism having a shaft, a clutch disc attached thereto, balanced structure including a weighted pawl adapted to engage said disc, horologic mechanism positively connected to said balanced structure for oscillating it at constant speed through a fixed angle, an adjustable cam adapted to hold said pawl from engagement with said disc for a variable fraction of said angle, and flow-responsive means for controlling the adjustment of said cam.

6. Flow-integrating apparatus comprising counting mechanism having a shaft, a clutch disc attached thereto, balanced structure including a weighted pawl adapted to engage said disc, horologic mechanism positively connected to said balanced structure for oscillating it at constant speed through a fixed angle, an adjustable cam adapted to hold said pawl from engagement with said disc for a variable fraction of said angle, flow-responsive means including a member movable to unequal extents for equal changes of rate of flow, and a pivoted cam interposed between said member and said adjustable cam to insure equal extents of movement of the latter for equal changes of rate of flow.

7. In combination, integrating mechanism comprising a reciprocating abutment, pivoted cam structure in engagement with and adapted to be actuated by said reciprocating abutment, counting mechanism, horologic mechanism in operative relation therewith, a rotatable clutch member mounted on said counting mechanism, a second clutch member adapted to engage said first clutch member in one direction of movement and oscillated by said horologic mechanism, and means to control the duration of periods of engagement of said clutch members comprising means operated by and in accordance with the position of said cam structure.

8. In combination, integrating mechanism comprising a reciprocating abutment, pivoted cam structure in engagement with and adapted to be actuated by said reciprocating abutment, counting mechanism, horologic mechanism in operative relation therewith, a rotatable clutch member mounted on said counting mechanism, a second clutch member adapted to engage said first clutch member in one direction of movement, structure supporting said second clutch member, a link member of substantially fixed length connecting said structure and said horologic mechanism to effect oscillation of said structure, and means to control the duration of periods of engagement of said clutch members in accordance with the position of said cam structure.

9. In combination, integrating mechanism comprising abutment structure vertically reciprocable in response to change in magnitude of a condition under measurement, suspended cam structure in the path of said abutment moved thereby during downward movement thereof, gravity actuated means to effect movement of said cam structure during upward movement of said abutment structure, counting mechanism, horologic mechanism in operative relation therewith, a rotatable clutch member mounted on said counting mechanism, a second clutch member adapted to engage said first clutch member in one direction of movement and oscillated by said horologic mechanism, and means to control the duration of periods of engagement of said clutch members comprising means operated by and in accordance with the position of said cam structure.

FREDRICK WAGNER.
HOWARD C. MITCHELL.